United States Patent Office 3,462,458
Patented Aug. 19, 1969

3,462,458
3 - (α - BROMOACYL) - 4 - HYDROXYCOUMARIN PRODUCTS AND CORRESPONDING CONDENSATION PRODUCTS
John S. McIntyre, Sarnia, Ontario, Canada, assignor to The Dow Chemical Company, Midland, Mich., a corporation of Delaware
No Drawing. Filed Apr. 24, 1967, Ser. No. 632,892
Int. Cl. C07d 7/30, 99/00; A01n 9/22
U.S. Cl. 260—343.2
8 Claims

ABSTRACT OF THE DISCLOSURE

The present invention is concerned with 3-(α-bromoacyl)-4-hydroxycoumarin products of the formula

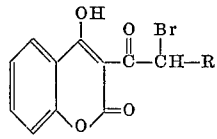

and with their corresponding base condensation products of the formula

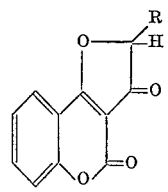

In the above and succeeding formulae in the present specification and claims, R represents hydrogen, alkyl being of from 1 to 8, both inclusive, carbon atoms, pyridyl, furyl, thienyl, pyrrolyl, phenyl, or phenyl substituted by from 1 to 2 substituents, each of which is independently bromo, chloro, methyl, or methoxy.

Both the 3-(α-bromoacyl)-4-hydroxycoumarin products and the corresponding condensation products, the latter being designated as 4H-furo(3,2-c)(1)-benzopyran-3(2H), 4-diones, are useful as agents to control, in the sense of suppressing, inhibiting, and/or killing, plants, such as, for example, pigweeds, bindweeds, barnyard grass, and the like. The compounds can also be employed for the control of bacterial and fungal organisms, such as, for example, tomato late blight. In addition, the 3-(α-bromoacyl)-4-hydroxycoumarin products are useful as agents to control insects and arachnids.

BACKGROUND OF THE INVENTION

Various 3-acyl-4-hydroxycoumarins are known in the prior art.

SUMMARY OF THE INVENTION

It has now been found that the 3-acyl-4-hydroxycoumarins of the prior art can be α-brominated to obtain corresponding 3-(α-bromoacyl)-4-hydroxycoumarin products of the formula

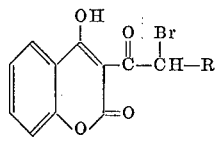

It has been further learned that such 3-(α-bromoacyl)-4-hydroxycoumarins undergo a base condensation to yield corresponding 4H - furo(3,2-c)(1) - benzopyran - 3(2H), 4-dione products of the formula

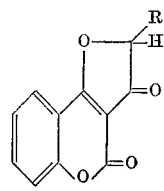

As noted above, both types of products are useful plant growth control.

In the above and succeeding formulae in the present specification and claims, R represents hydrogen, alkyl being of from 1 to 8, both inclusive, carbon atoms, pyridyl, furyl, thienyl, pyrrolyl, phenyl, or phenyl substituted by from 1 to 2 substituents, each of which is independently bromo, chloro, methyl, or methoxy. In the present specification and claims, pyridyl is used (in the common sense) to designate 2-, 3-, or 4-pyridyl; furyl, to designate 2- or 3-furyl; thienyl, to designate 2- or 3-thienyl; and pyrrolyl, to designate 1-, 2-, or 3-pyrrolyl.

DESCRIPTION OF THE PREFERRED EMBODIMENTS

The 3-(α-bromoacyl)-4-hydroxycoumarins

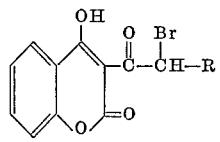

are prepared by bromination of the corresponding 3-acyl-4-hydroxycoumarins:

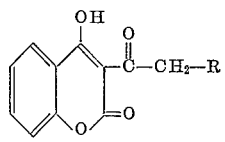

In a preferred embodiment, the bromination is carried out with liquid bromine in acetic acid, and in the presence of a source of light. While some immediate source of direct light, in addition to normal room light, is necessary in order that the reaction proceed smoothly, relatively low levels of light suffice. A 100 watt incandescent bulb positioned several inches from the reaction flask has been found to give good results.

The reaction is exothermic and can be carried out at temperatures over a wide range, such as from room temperature to the boiling temperature of the acetic acid; generally, it is convenient and preferred to conduct the reaction at reflux. The exact amounts of the reactants employed are not critical, some of the desired 3-(α-bromoacyl)-4-hydroxycoumarin product being obtained when employing any amounts. However, the reaction consumes the reactants in amounts representing equimolecular proportions, and the use of such amounts is preferred.

In carrying out the reaction, the 3-acyl-4-hydroxycoumarin is contacted together with the bromine in acetic acid, and the resulting reaction mixture illuminated, and, if desired, heated. Some of the desired product is obtained immediately upon the contacting together of the reactants; however, higher yields are obtained if the reaction mixture is held for a period of time to insure completion of the reaction. The product is separated in conventional procedures, most typically, by removing the acetic acid under subatmospheric pressure to obtain the product as a residue. Such product residue can be purified, if desired; inasmuch as the 3-(α-bromoacyl)-4-hydroxycoumarins are typically crystalline solid materials, purification is generally achieved by recrystallization of the product such as recrystallization from a loweralkanol, acetic acid, or a mixture thereof.

Base dehydrobromination of the 3-(α-bromoacyl)-4-hydroxycoumarins results in the corresponding 4H-furo-(3,-2c)(1)-benzopyran-3(2H), 4-dione products of the formula

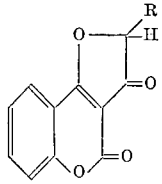

In the preferred embodiment for the preparation of products of this formula, the 3-(α-bromoacyl)-4-hydroxycoumarin wherein R is the same as R in the desired product is mixed with a quantity of pyridine and the resulting mixture heated, such as on a steam bath, for a period of time. The exact amounts of the 3-(α-bromoacyl)-4-hydroxycoumarin and pyridine are not critical; good results are obtained when employing the substances in amounts representing a ratio of 1 gram of the 3-(α-bromoacyl)-4-hydroxycoumarin to 2 milliliters of pyridine. Similarly, the precise temperature under which the dehydrobomination is carried out is not critical; for example, the reaction proceeds at room temperatures. However, higher yields are obtained in a shorter period of time if the mixture of 3-(α-bromoacyl)-4-hydroxycoumarin and pyridine is heated to temperatures above room temperature, and, most conveniently, if the mixture is heated on a steam bath. Such heating also serves to evaporate a portion, which may be a major portion, of the pyridine, thus leaving the desired 4H-furo(3,2-c)(1)-benzopyran-3(2H),4-dione product.

Purification of the product residue, if desired, is carried out in conventional procedures.

The following examples illustrate the best mode now known for the practice of the present invention and will enable those skilled in the art to practice the same.

Example 1.—3-(α-bromopropionyl)-4-hydroxycoumarin

Bromine (2 milliliters; 0.05 mole) was added slowly to a solution of 3-propionyl-4-hydroxycoumarin (10.8 grams; 0.05 mole) in 40 milliliters of acetic acid. The resulting reaction mixture was illuminated by positioning near the reaction vessel a 100 watt incandescent bulb; in addition, the reaction mixture was heated to reflux temperature and maintained thereat for 2 hours. Thereafter, the acetic acid was removed by evaporation on a steam bath to obtain the desired 3-(α-bromopropionyl)-4-hydroxycoumarin product as a residue. This product residue was crystallized from methanol and the purified product so obtained found to melt at 139–140.5° C.

Example 2.—2-methyl-4H-furo(3,2-c)(1)-benzopyran-3(2H),4-dione 20 grams of 3-(α-bromopropionyl)-4-hydroxycoumarin prepared as described in Example 1 were added to 40 milliliters of pyridine and the resulting mixture heated on a steam bath for 1 hour. At the end of the 1 hour period, most of the pyridine had evaporated, leaving the desired 2-methyl-4H-furo(3,2-c)(1)-benzopyran-3(2H),4 - dione product as a residue. This product residue was mixed with a quantity of methanol and the resulting mixture filtered. After recrystallization from acetic acid, the product melted at 227.5–228.5° C.

Other representative products of the present invention, prepared in the procedures of the above examples, are those of the following examples.

Examples 3–36

From 3-acetyl-4-hydroxycoumarin and bromine, 3-(α-bromoacetyl)-4-hydroxycoumarin product melting at 144–6° C.; dehydrobromination yields the corresponding 4-H-furo(3,2-c)(1)-benzopyran-3(2H),4-dione product melting at 241–1.5° C.

From 3-(phenylacetyl)-4-hydroxycoumarin and bromine, 3-(α-bromo-α-phenylacetyl)-4 - hydroxycoumarin product having a molecular weight of 359.2; and by dehydrobromination, the corresponding 2-phenyl-4H-furo-(3,2-c)(1)-benzopyran-3(2H),4-dione product having a molecular weight of 278.3.

From 3-butyryl-4-hydroxycoumarin and bromine, 3-(α-bromobutyryl)-4-hydroxycoumarin product melting at 130–1.5° C.; dehydrobromination yields the corresponding 2-ethyl-4H - furo(3,2-c)(1) - benzopyran - 3(2H), 4-dione product melting at 185–7° C.

From 3-(α-(2-pyrrolyl)acetyl) - 4 - hydroxycoumarin and bromine, 3-(α-bromo-α-(2 - pyrrolyl)acetyl)-4-hydroxy coumarin product having a molecular weight of 347.2; dehydrobromination yields the corresponding 2-(2-pyrrolyl)-4H - furo(3,2-c)(1)-benzopyran - 3(2H), 4-dione product having a molecular weight of 266.2.

From 3-(α-(p-chlorophenyl)acetyl)-4-hydroxycoumarin and bromine, 3-(α-bromo-α-(p-chlorophenyl)acetyl)-4-hydroxycoumarin product (M.W. of 393.6); upon dehydrobromination, the corresponding 2-(p-chlorophenyl)-4H-furo(3,2-c)(1)-benzopyran-3(2H),4 - dione product (M.W. of 312.7) is obtained.

From 3-valeryl-4-hydroxycoumarin and bromine, 3-(α-bromovaleryl)-4-hydroxycoumarin product melting at 108–10° C.; upon dehydrobromination, the corresponding 2-n-propyl-4H-furo(3,2-c)(1)-benzopyran-3(2H),4-dione product melting at 189–90° C. is obtained.

From 3-decanoyl-4-hydroxycoumarin and bromine, 3-(α-bromodecanoyl)-4-hydroxycoumarin product having a molecular weight of 395.3; on dehydrobromination, there is obtained the corresponding 2-n-octyl-4H-furo(3,2-c)(1)-benzopyran-3(2H),4-dione product having a molecular weight of 314.4.

From 3-hexanoyl-4-hydroxycoumarin and bromine, 3-(α-bromohexanoyl)-4-hydroxycoumarin product melting at 108–10° C.; upon dehydrobromination, the corresponding 2-n-butyl - 4H - furo(3,2-c)(1)-benzopyran-3(2H),4-dione product, melting at 163.5–5° C., is obtained.

From 3-(α-(2-thienyl)acetyl)-4-hydroxycoumarin and bromine, 3-(α-bromo-α-(2-thienyl)acetyl) - 4 - hydroxycoumarin product (M.W. of 365.2); on dehydrobromination, there is obtained the corresponding 2-(2-thienyl)-4H - furo(3,2-c)(1)-benzopyran-3(2H),4-dione product having a molecular weight of 284.3.

From 3-(α-(m-bromophenyl)acetyl)-4-hydroxy-coumarin and bromine, 3-(α-bromo-α-(m-bromophenyl)acetyl)-4-hydroxycoumarin product (M.W. of 438.1); on dehydrobromination, there is obtained the corresponding 2-(m-bromophenyl) - 4H - furo(3,2-c)(1) - benzopyran-3(2H),4-dione product (M.W. of 357.2).

From 3-heptanoyl-4-hydroxycoumarin and bromine, 3-(α-bromoheptanoyl)-4-hydroxycoumarin product melting at 92–94° C.; dehydrobromination of the substance yields the corresponding 2-n-pentyl-4H-furo(3,2-c)(1)-benzopyran-3(2H),4-dione product melting at 157–8.5° C.

From 2-nonanoyl-3-hydroxycoumarin and bromine, 3-(α-bromononanoyl)-4-hydroxycoumarin product having a molecular weight of 381.3; by dehydrobromination, there is obtained the corresponding 2-heptyl-4H-furo(3,2-c)(1)-benzopyran-3(2H),4-dione product having a molecular weight of 300.4.

From 3 - (4-methylvaleryl)-4-hydroxycoumarin and bromine, 3-(α-bromo-4-methylvaleryl)-4-hydroxycoumarin product melting at 94–7° C.; upon dehydrobromination, there is obtained the corresponding 2-isobutyl-4H-furo(3,2-c)(1)-benzopyran-3(2H),4-dione product melting at 173–4.5° C.

From 3-(α-(3-furyl)acetyl)-4-hydroxycoumarin and bromine, 3 - (α-bromo-α-(3-furyl)acetyl)-4-hydroxycoumarin product having a molecular weight of 349.2; by dehydrobromination, there is obtained the corresponding 2 - (3-furyl)-4H-furo(3,2-c)(1)-benzopyran - 3(2H),4-dione product having a molecular weight of 268.2.

From 3-(α-(4-pyridyl)acetyl)-4-hydroxycoumarin and bromine, 3 - (α-bromo-α-(4-pyridyl)acetyl)-4-hydoxycoumarin product having a molecular weight of 360.2; by dehydrobromination, there is obtained the corresponding 2 - (4-pyridyl)-4H-furo(3,2-c)(1)-benzopyran-3(2H),4-dione product having a molecular weight of 279.3.

From 3 - (α-(o-tolyl)acetyl)-4-hydroxycoumarin and bromine, 3-(α-bromo-α-(o-tolyl)acetyl)-4-hydroxycoumarin product (M.W. of 373.2); by dehydrobromination, there is obtained the corresponding 2-(o-tolyl)-4H-furo(3,2-c)(1)-benzopyran-3(2H), 4 - dione product (M.W. of 292.3).

From 3 - (α-(p-methoxyphenyl)acetyl)-4-hydroxycoumarin and bromine, 3-(α-bromo-α-(p-methoxyphenyl)-acetyl)-4-hydroxycoumarin product (M.W. of 389.2); upon dehydrobromination, there is obtained the corresponding 3 - (p-methoxyphenyl)-4H-furo(3,2-c)(1)-benzopyran-3(2H),4-dione product (M.W. of 308.3).

When one of the products of the present invention is employed as a parasiticide, the unmodified product can be utilized. However, the present invention also encompasses the utilization of the product together with a parasiticide adjuvant. In such utilization, the product can be dispersed on a finely divided solid and the resulting preparation employed as a dust. Also, a product of the present invention, or a composition comprising a product of the present invention and a finely divided solid, can be dispersed in water with the aid of a wetting agent and the resulting aqueous suspension employed as a spray. In other procedures, a product according to the present invention can be employed as the constituent of organic liquid compositions, oil-in-water or water-in-oil emulsions, or water dispersions, with or without the addition of a wetting, dispersing, or emulsifying agent.

In representative procedures, an aqueous composition comprising, as sole active agent, 500 parts of 3-(α-bromopropionyl)-4-hydroxycoumarin per million parts by weight of ultimate composition gave essentially complete control of two spotted spider mites on infested host plants treated with the composition. Also, an aqueous composition comprising 4,000 parts of 3-(α-bromo-4-methylvaleryl)-4-hydroxycoumarin per million parts by weight of total composition gave 100 percent kill of a stand of young tomato plants to which is was applied as a spray.

Each of 4H-furo(3,2-c)(1)-benzopyran-3(2H),-4-dione and 2-ethyl - 4H - furo(3,2-c)(1)-benzopyran-3(2H),4-dione gave essentially complete kill and control of pigweeds. The evaluation was carried out by separately dispersing each compound in an aqueous formulation, treating seed beds with the formulation at such rate as to supply approximately 25 pounds of compound per acre, thereafter seeding the treated seed beds, and observing the treated seed beds for several weeks.

I claim:
1. Compound of the formula

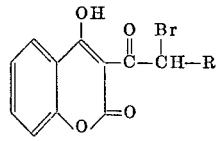

wherein R represents alkyl being of from 1 to 8, both inclusive, carbon atoms, pyridyl, furyl, thienyl, pyrrolyl, phenyl, or phenyl substituted by from 1 to 2 substituents, each of which is independently bromo, chloro, methyl, or methoxy.

2. The compound of claim 1 which is 3-(α-bromopropionyl)-4-hydroxycoumarin.

3. The compound of claim 1 which is 3-(α-bromobutyryl)-4-hydroxycoumarin.

4. The compound of claim 1 which is 3-(α-bromo-α-phenylacetyl)-4-hydroxycoumarin.

5. Compound of the formula

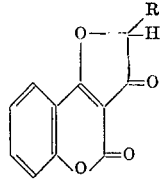

wherein R represents hydrogen, alkyl being of from 1 to 8, both inclusive, carbon atoms, pyridyl, furyl, thienyl, pyrrolyl, phenyl, or phenyl substituted by from 1 to 2 substituents, each of which is independently bromo, chloro, methyl, or methoxy.

6. The compound of claim 5 which is 4H-furo(3,2-c)-(1)-benzopyran-3(2H),4-dione.

7. The compound of claim 5 which is 2-methyl-4H-furo(3,2-c)(1)-benzopyran-3(2H),4-dione.

8. The compound of claim 5 which is 2-phenyl-4H-furo(3,2-c)(1)-benzopyran-3(2H),4-dione.

References Cited

Weiss et al.: Chemical Abstracts, vol. 23 (1929), p. 3219.

Chemical Abstracts, 5th Decennial Index, vols. 41–50 (1947–56), p. 3646S.

Mellor's Modern Inorganic Chem., Longmans, Green and Co., New York (1939), pp. 535–7.

JAMES A. PATTEN, Primary Examiner

U.S. Cl. X.R.

71—88; 204—158; 260—295, 326.3, 332.2; 424—281